(12) United States Patent
Davies et al.

(10) Patent No.: US 8,128,996 B2
(45) Date of Patent: *Mar. 6, 2012

(54) PRIMER COATING OF STEEL

(75) Inventors: Gerald Howard Davies, Newcastle-Upon-Tyne (GB); Gillian Diane Davies, legal representative, Newcastle Upon Tyne (GB); Paul Anthony Jackson, County Durham (GB)

(73) Assignee: Akzo Nobel N.V., Arnhem (NL)

( * ) Notice: Subject to any disclaimer, the term of this patent is extended or adjusted under 35 U.S.C. 154(b) by 582 days.

This patent is subject to a terminal disclaimer.

(21) Appl. No.: 10/380,130

(22) PCT Filed: Sep. 13, 2001

(86) PCT No.: PCT/EP01/10635
§ 371 (c)(1),
(2), (4) Date: Jun. 20, 2003

(87) PCT Pub. No.: WO02/22746
PCT Pub. Date: Mar. 21, 2002

(65) Prior Publication Data
US 2005/0276923 A1 Dec. 15, 2005

(30) Foreign Application Priority Data
Sep. 13, 2000 (EP) .................................... 00307988

(51) Int. Cl.
*B05D 1/18* (2006.01)
(52) U.S. Cl. .................. 427/372.2; 427/376.4; 427/435; 427/327
(58) Field of Classification Search .... 427/397.7–397.8, 427/403–406, 419.1–419
See application file for complete search history.

(56) References Cited

U.S. PATENT DOCUMENTS

| 2,998,328 | A |   | 6/1961 | Munger et al. .................. 117/70 |
| 3,130,061 | A | * | 4/1964 | McMahon et al. ............. 106/623 |
| 3,142,583 | A | * | 7/1964 | McMahon et al. ............. 428/560 |
| 3,180,746 | A |   | 4/1965 | Patton et al. ..................... 106/74 |
| 3,258,346 | A |   | 6/1966 | Fisher, Jr. ......................... 106/14 |
| 3,320,082 | A |   | 5/1967 | McMahon .................... 106/287 |
| 3,345,194 | A |   | 10/1967 | Weldes et al. ................ 106/287 |
| 3,392,039 | A |   | 7/1968 | Cuneo, Jr. ......................... 106/84 |
| 3,455,709 | A |   | 7/1969 | Sears |
| 3,522,066 | A |   | 7/1970 | Forsyth ............................ 106/74 |
| 3,549,395 | A |   | 12/1970 | Sears et al. |
| 3,620,784 | A |   | 11/1971 | Schutt .............................. 106/84 |
| 3,715,224 | A |   | 2/1973 | Campbell ........................ 106/74 |
| 3,721,574 | A | * | 3/1973 | Schneider et al. ............. 106/623 |
| 3,793,055 | A |   | 2/1974 | Shodai et al. ................ 117/47 R |
| 3,893,864 | A | * | 7/1975 | Beers ............................ 106/1.17 |
| 3,977,888 | A |   | 8/1976 | Sano et al. ....................... 106/74 |
| 4,006,030 | A |   | 2/1977 | Yoshida et al. ................. 106/74 |
| 4,086,096 | A |   | 4/1978 | McLeod ...................... 106/1.17 |
| 4,162,169 | A |   | 7/1979 | Schutt .............................. 106/74 |
| 4,190,449 | A |   | 2/1980 | Naoi et al. |
| 4,230,496 | A |   | 10/1980 | Falcone, Jr. et al. ........ 106/14.21 |
| 4,277,284 | A |   | 7/1981 | Ginsberg et al. .............. 106/1.05 |
| 4,479,824 | A |   | 10/1984 | Schutt ........................ 106/14.21 |
| RE32,250  | E |   | 9/1986 | Plueddemann ............ 252/389.1 |
| 4,818,595 | A |   | 4/1989 | Ellis |
| 4,888,056 | A | * | 12/1989 | van der Kolk et al. ........ 106/1.17 |
| 4,902,442 | A |   | 2/1990 | Garces ........................ 252/313.2 |
| 4,917,960 | A | * | 4/1990 | Hornberger et al. ........... 428/550 |
| 5,091,224 | A |   | 2/1992 | Kushida et al. ............. 427/419.4 |
| 5,221,497 | A |   | 6/1993 | Watanabe et al. ........... 252/313.2 |
| 5,246,488 | A |   | 9/1993 | Tanaka et al. ............... 106/14.44 |
| 6,329,059 | B1 |  | 12/2001 | Karchevsky et al. .......... 428/414 |
| 6,337,036 | B1 |  | 1/2002 | Karchevsky et al. .......... 252/512 |
| 6,468,336 | B1 | * | 10/2002 | Fiedler et al. ............... 106/14.21 |
| 6,482,536 | B1 |  | 11/2002 | Tanaka et al. .................. 428/626 |
| 6,634,575 | B2 |  | 10/2003 | Krasutsky et al. |

FOREIGN PATENT DOCUMENTS

| EP | 0 295 834 A1 | 12/1988 |
| GB | 997094 | 6/1965 |
| GB | 1007481 | 10/1965 |
| GB | 1 226 360 | 3/1971 |
| GB | 1 485 169 | 9/1977 |
| GB | 2 100 744 A | 1/1983 |
| JP | 1 541 022 | 2/1979 |
| JP | 55-100921 | 8/1980 |
| JP | 55-106271 | 8/1980 |
| JP | 6-200188 | 7/1994 |
| JP | 7-70476 | 3/1995 |
| KR | 8101300 | 10/1981 |
| WO | WO 88/06177 | 8/1988 |
| WO | WO 98/58028 | 12/1998 |
| WO | WO 00/55261 | 9/2000 |
| WO | WO 02/22745 A1 | 3/2002 |

OTHER PUBLICATIONS

International Search Report PCT/EP01/10635 dated Jan. 24, 2002.
Patent Abstracts of Japan abstracting JP 55-106271 (1980).
Patent Abstracts of Japan abstracting JP 06-200188 (1994).
Patent Abstracts of Japan abstracting JP 07-070476 (1995).
Sears, Jr., G. W.; "Determination of Specific Surface Area of Colloidal Silica by Titration with Sodium Hydroxide," Analytical Chem., vol. 28, No. 12 (1956), pp. 1981-1983.
English language translation of Japanese Laid-Open No. 1976-73029; laid open date Jun. 24, 1976.

(Continued)

*Primary Examiner* — David Turocy
(74) *Attorney, Agent, or Firm* — Kenyon & Kenyon LLP

(57) ABSTRACT

A process for primer coating a steel substrate with a primer coating comprising a silica binder, wherein the binder comprises an aqueous silica sol having a $SiO_2/M_2O$ mole ratio, wherein M represents the total of alkali metal and ammonium ions, of at least 6:1, and wherein after the primer coating has dried to the extent that it is touch dry, the coated substrate is immersed in water or alternatively kept in an atmosphere with a relative humidity of at least 50%. The present invention also relates to a process for primer coating a steel substrate with a primer coating comprising a silicate or silicate binder, wherein the binder comprises an aqueous silica sol or alkali metal silicate having a $SiO_2/M_2O$ mole ratio, wherein M represents the total of alkali metal and ammonium ions, of at least 6:1, and wherein after the primer coating has dried to the extent that it is touch dry, the coated substrate prior to immersion in water or storage in an atmosphere with a relative humidity of at least 80% is treated with a film strength-enhancing solution.

24 Claims, No Drawings

OTHER PUBLICATIONS

English language translation of Japanese Laid-Open No. 1976-79125; laid open date Jul. 9, 1976.
English language translation of Japanese Laid-Open No. 1980-100921; laid open date Aug. 1, 1980.
Chemical abstract 66:56644 abstracting NL 6604385.
Chemical abstract 85:165408 abstracting JP 51073029.
Chemical abstract 85:181302 abstracting JP 51079125.
Chemical abstract 86:91877 abstracting JP 51150533.
Derwent abstract 1980-68747C/198039 abstracting JP 55106271-A.
Derwent abstract 1994-269638/199433 abstracting JP 06200188-A.
Derwent abstract 1995-145041/199519 abstracting JP 07070476-A.
Abstract of KR8100661 from EPO on-line data base esp@cenet.
International Search Report for Application No. PCT/EP00/02473 dated Jun. 27, 2000.
Written Opinion of PCT/EP01/10552 dated Jul. 25, 2002.
Written Opinion of PCT/EP01/10552 dated Apr. 10, 2002.
International Preliminary Examination Report for Application No. PCT/EP01/10552 dated Jan. 10, 2003.
USPTO's office communication dated Jan. 14, 2004 referencing U.S. Appl. No. 09/936,794.
USPTO's office communication dated Aug. 23, 2004 referencing U.S. Appl. No. 09/936,794.
USPTO's office communication dated Sep. 3, 2004 referencing U.S. Appl. No. 10/380,129.
Definition of "dispersion" from Hawley's Condensed Chemical Dictionary, 12$^{th}$ Edition, © 1998 by Van Nostrand Reinhold, p. 435.
Definition of "colloid chemistry" from Hawley's Condensed Chemical Dictionary, 12$^{th}$ Edition, © 1998 by Van Nostrand Reinhold, pp. 300-301.
Iler, Ralph K., "Lithium Silicates," Chapter 2, pp. 145-150.
Iler, Ralph K., Table 4.3. Properties of Commercial Silica Sols Listed by Manufacturer, pp. 416-418.
Iler, Ralph K., "The Chemistry of Silica," John Wiley & Sons (1979) pp. 407-409.
Interview Summary mailed Nov. 30, 2007; 3 pages, U.S. Appl. No. 10/380,129.
Response to Non-Final Office Action filed on Nov. 28, 2007; 14 pages; U.S. Appl. No. 10/380,129.
Non-Final Office Action mailed Jun. 28, 2007; 6 pages; U.S. Appl. No. 10/380,129.
Non-Final Office Action mailed Feb. 12, 2008; 9 pages; U.S. Appl. No. 10/380,129.
Final Office Action mailed Sep. 19, 2008; 7 pages; U.S. Appl. No. 10/380,129.
DuPont, Industrial Chemical Department, "Lithium Polysilicate Zinc-Rich Paint Vehicles," (Oct. 1974), pp. 1-7.
Baehr, C.H. et al., "Soluble Silicates—Highly Versatile and Safe," SÖFW International Journal for Applied Science (Apr. 2007), pp. 88-94.
PQ Corporation, Bulletin 17-110, "Lithium Silicates," (2005) 1 page.
INEOS Silicas, "Soluble Silicas and their Applications," Issue 1 (Dec. 2002) SCT 204, pp. 1-7.
Iler, R.K. *The Chemistry of Silica—Solubility, Polymerization, Colloid and Surface Properties, and Biochemistry*, John Wiley & Sons, New York (Jun. 1979), Table of Contents, pp. xi-xix; and "Solutions of Polysilicates," pp. 143-149; "Colloidal Silica-Concentrated Sols," pp. 312-313; "Aggregation of Particles," p. 367.
Iler, R.K. *The Chemistry of Silica—Solubility, Polymerization, Colloid and Surface Properties, and Biochemistry*, John Wiley & Sons, New York (Jun. 1979), "Solutions of Polysilicates, Aggregation of Particles," p. 367.
Response to Office Action filed Sep. 11, 2009, U.S. Appl. No. 10/380,129.
Non-Final Office Action mailed Dec. 19, 2008, U.S. Appl. No. 10/380,129.
Advisory Action mailed Dec. 3, 2008, U.S. Appl. No. 10/380,129.
Response to Final Office Action filed Nov. 19, 2008.

* cited by examiner

PRIMER COATING OF STEEL

This application is the national phase of PCT/EP01/10635, filed Sep. 13, 2001, which claims the benefit of European Patent Application No. 00307988.6, filed Sep. 13, 2000.

FIELD OF THE INVENTION

This invention relates to a process for the primer coating of steel. In particular, it relates to the coating of semi-finished steel products which are subsequently to be fabricated by heat-intensive processes and overcoated.

BACKGROUND OF THE INVENTION

Such semi-finished steel products are used in the shipbuilding industry and for other large-scale structures such as oil production platforms and include steel plates, for example of thickness 6 to 75 mm, bars, girders, and various steel sections used as stiffening members. The most important heat-intensive process is welding; substantially all such semi-finished steel products are welded. Other important heat-intensive processes are cutting, for example oxy-fuel cutting, plasma cutting or laser cutting, and heat fairing, where the steel is bent into shape while being heated. These steel products are often exposed to the weather during storage before construction and during construction, and they are generally coated with a coating called a "shop primer" or "pre-construction coating" to avoid corrosion of the steel occurring before the steel construction, e.g. a ship, is given its full coating of anticorrosive paint, thereby avoiding the problem of having to overcoat or remove steel corrosion products. In most big shipyards, the shop primer is applied as one of several treatments carried out on a production line in which the steel is for example preheated, shot- or grit-blasted to remove mill scale and corrosion products, shop primed, and passed through a drying booth. Alternatively, the shop primer can be applied by a trade coater or steel supplier before the steel is delivered to the shipyard or other construction site.

Although the main purpose of the shop primer is to provide temporary corrosion protection during construction, it is preferred by shipbuilders that the shop primer does not need to be removed but can remain on the steel during and after fabrication. Steel coated with the shop primer thus needs to be weldable without removal of shop primer and to be overcoatable with the types of protective anti-corrosive coatings generally used on ships and other steel constructions, with good adhesion between the primer and the subsequently applied coating. The shop primed steel should preferably be weldable without any significant detrimental effect on the quality of the weld or on the speed of the welding process and should be sufficiently resistant to heat for the shop primer to retain its anticorrosive properties in areas heated during fairing or during welding of the opposite face of the steel.

Commercially successful shop primers available today are solvent borne coatings based on prehydrolyzed tetraethyl orthosilicate binders and zinc powder. Such coatings contain a large proportion of volatile organic solvent, typically about 650 grams per liter, to stabilize the paint binder and to enable the product to be applied as a thin film, typically of about 20 microns thick. Release of volatile organic solvent can be harmful to the environment and is regulated by legislation in many countries. There is a need for a shop primer which releases no, or much less, volatile organic solvent. Examples of such coatings are described in U.S. Pat. No. 888,056 and JP-A-7-70476.

JP-A-6-200188 is concerned with shop primer coatings and mentions the possibility of using an aqueous alkali silicate salt type binder. Coatings comprising an aqueous alkali metal silicate and zinc powder are also proposed in GB-A-1226360, GB-A-1007481, GB-A-997094, U.S. Pat. No. 230,496, and JP-A-55-106271. Alkali silicate binders for anticorrosive coatings are also mentioned in U.S. Pat. Nos. 3,522,066, 3,620,784, 162,169, and 479,824.

KR 8101300 describes a process in which a composition comprising an alkyl orthosilicate or an alkali metal silicate, zinc powder, and aluminium oxide powder or titanium oxide powder is applied to a steel plate and subsequently left to dry at 20° C. and 75% RH. The document does not mention or suggest any advantageous effect of these specific drying conditions on the film properties nor on the rate of film property development.

We have found that primer coatings based on an aqueous alkali silicate binder containing zinc powder can give adequate corrosion protection and allow the steel surfaces they cover to be welded, but give rise to problems when overcoated. The aqueous silicates contain a large quantity of alkali metal cations, which are required to keep the silicate in aqueous solution and these ions are still present in the coating after it has dried. We have found that, if primer coatings having these large quantities of alkali metal ions are overcoated with any conventional organic coating and then immersed in water, blistering (local delamination of the coating) occurs. We have performed tests which show that this problem can be reduced if the coating is weathered outside for some time after application of the shop primer or washed prior to overcoating. However, these processes are not compatible with use in today's high productivity shipyards.

Aqueous silica sols having a very low alkali metal ion content are available commercially, but coatings based on such sols normally have very poor (initial) film strength in terms of adhesion, cohesion, hardness, and resistance to abrasion and water. These poor physical properties of the coating make it susceptible to damage during handling or further processing. This brings the potential requirement of significant coating repair with major cost implications. Suggested improvements to silica sol coatings are described in U.S. Pat. No. 3,320,082, which adds a water-immiscible organic amine, GB-A-1541022, which adds a water-soluble acrylamide polymer, and GB-A-1485169, which adds a quaternary ammonium or alkali metal silicate, but such coatings have not achieved physical properties similar to those of coatings based on alkali metal silicates. Coatings based on silica sols show low levels of blistering when overcoated/immersed. Although the water-soluble salt content and osmotic pressure are low, blistering can still occur, as the coating exhibits little resistance to blister initiation/growth due to its poor physical properties.

There is a need for a water based shop primer of low alkali metal ion content which has improved adhesion to substrates and improved film strength in terms of the properties discussed above to resist blister initiation and growth. Further, there is a need for a blister-free water based shop primer showing fast development of the physical properties of the coating after application of the shop primer to enable handling and further processing of the substrate without the risk of damaging the coating.

SUMMARY OF THE INVENTION

The process according to the present invention for primer coating of steel which is intended to be fabricated and overcoated provides a solution to the above-mentioned problems/ disadvantages. The process according to the present invention for primer coating a steel substrate with a primer coating comprising a silica binder is characterized in that the binder comprises an aqueous silica sol having a $SiO_2/M_2O$ mole ratio, wherein M represents the total of alkali metal and ammonium ions, of at least 6:1, and that after the primer coating has dried to the extent that it is touch dry, the coated substrate is immersed in water or alternatively kept in an atmosphere with a relative humidity of at least 50%.

The present invention further relates to a process for primer coating a steel substrate with a primer coating comprising a silicate or silicate binder wherein the binder comprises an aqueous silica sol or alkali metal silicate having a $SiO_2/M_2O$ mole ratio, wherein M represents the total of alkali metal and ammonium ions, of at least 6:1, and wherein after the primer coating has dried to the extent that it is touch dry, the coated substrate prior to immersion in water or storage in an atmosphere with a relative humidity of at least 80% is treated with a film strength-enhancing solution.

For the purpose of the present invention, a film strength-enhancing solution is a solution that enhances the film strength of a primer coating and/or accelerates the development of the film strength with time.

DETAILED DESCRIPTION OF THE INVENTION

The binder is most preferably based on an aqueous silica sol. Such sols are available from Akzo Nobel under the Registered Trademark "Bindzil" or from DuPont under the Registered Trademark "Ludox", although the literature concerning them emphasizes that conventional grades of colloidal silica are not good film formers. Various grades of sol are available having various colloidal silica particle sizes and containing various stabilizers. The particle size of the colloidal silica can for example be in the range 3 to 100 nm; particle sizes towards the lower end of this range, for example 5 to 22 nm, are preferred. It was found that compositions comprising a binder having colloidal silica particles with an average particle size equal to or below 16 nm, preferably equal to or below 10 nm, show sufficient development of the properties in the process according to the present invention without the need to also treat the coated surface with a film strengthening solution. For compositions comprising a binder having colloidal silica particles with an average particle size above 16 nm, treatment with a film strengthening solution can give a clear advantage, in particular when the coated substrate is thereafter immersed in water or kept in an atmosphere with a relative humidity of at least 80%.

The silica sol preferably has a $SiO_2/M_2O$ mole ratio of at least 25:1, more preferably of at least 50:1, and may have a $SiO_2/M_2O$ mole ratio of 200:1 or more. Further, it is possible to use a blend of two or more silica sols having a different $SiO_2/M_2O$ mole ratio, wherein the $SiO_2/M_2O$ mole ratio of the blend is at least 25:1. The sol can be stabilized by alkali, for example sodium, potassium, or lithium hydroxide or quaternary ammonium hydroxide, or by a water-soluble organic amine such as alkanolamine. The coating composition should preferably be substantially free of any ammonium-stabilized silica sol, since the presence of an ammonium-stabilized sol could result in gelling of the composition, in particular when the binder mainly consists of ammonium-stabilized silica sol and the coating composition also contains zinc powder.

The silica sol can be blended with a minor amount of an alkali metal silicate, for example lithium silicate, sodium-lithium silicate or potassium silicate, or with quaternary ammonium silicate. Other examples of suitable sol-silicate blends or mixtures can be found in U.S. Pat. No. 4,902,442.

The addition of an alkali metal or ammonium silicate may improve the initial film-forming properties of the silica sol, but the amount of alkali metal silicate should be low enough to have a $SiO_2/M_2O$ mole ratio of the binder sol of at least 6:1, preferably at least 8:1, and most preferably above 15:1. For the purpose of the present application, a minor amount of alkali metal silicate means that the weight ratio of alkali metal silicate to silica sol in the composition is smaller than 0.5, preferably smaller than 0.25, more preferably smaller than 0.1.

The silica sol can alternatively or additionally contain a dissolved or dispersed organic resin. The organic resin preferably is a latex, for example a styrene butadiene copolymer latex, a styrene acrylic copolymer latex, a vinyl acetate ethylene copolymer latex, a polyvinyl butyral dispersion, a silicone/siloxane dispersion, or an acrylic based latex dispersion. Examples of suitable latex dispersions that can be used include XZ94770 and XZ94755 (both ex Dow Chemicals), Airflex® 500, Airflex® EP3333 DEV, Airflex® CEF 52, and Flexcryl® SAF34 (all ex Air Products), Primal® E-330DF and Primal® MV23 LO (both ex Rohm and Haas), and Silres® MP42 E, Silrese® M50E, and SLM 43164 (all ex Wacker Chemicals). Water-soluble polymers such as acrylamide polymers can be used but are less, preferred. The organic resin is preferably used at up to 35% by weight, based on solid binder. For compositions comprising a binder having colloidal silica particles with an average particle size equal to or below 10 nm, the organic resin is preferably used up to 20% by weight, more preferably 1-15% by weight, based on solid binder. For compositions comprising a binder having colloidal silica particles with an average particle size above 10 nm, for example between 12 and 22 nm, or between 12 and 16 nm, an increased level of organic resin of up to 35% by weight based on solid binder is preferred.

Higher amounts of organic resin may cause weld porosity during subsequent welding. It was found that the addition of an organic resin improves the adhesion/cohesion as measured in the cross hatch test.

Alternatively, the silica sol can contain a silane coupling agent which contains alkoxysilane groups and an organic moiety containing a functional group such as an amino, epoxide or isocyanate group. The silane coupling agent preferably is an aminosilane such as gamma-aminopropyl triethoxy silane or gamma-aminopropyl trimethoxy silane, or a partial hydrolysate thereof, although an epoxy silane such as gamma-glycidoxypropyl trimethoxy silane can also be used. The silane coupling agent preferably is present at up to 30% by weight, for example 1-20% by weight, based on silica.

The binder of the primer coating can alternatively or additionally comprise an aqueous solution of an alkali metal or ammonium silicate stabilized by a siliconate substituted by at least one anionic group of lower pKa than silicic acid, such as a carboxylate or sulphonate group. Such a binder preferably is a solution having a $SiO_2/M_2O$ mole ratio in the range 8:1 to 30:1 and a pH in the range 7 to 10.5 prepared by lowering the pH of a solution of silicate and siliconate by cation exchange. Thus the siliconate can be added at relatively low levels, for example at a molar ratio of 1:2 to 1:20, to a conventional 3.9:1 $SiO_2/K_2O$ alkali silicate. The solids may then be reduced to improve ease of processing and to further improve stability. At this stage the solution has a pH of 12-12.5. The solution is ion-exchanged using a standard ion-exchange resin. $K^+$ ions are replaced with $H^+$ reducing both the alkali content of the binder and the pH. Without the presence of the siliconate the silicate would gel on reducing the pH. Clear, stable solutions with a pH as low as 8 have been obtained. The resultant binder has an $SiO_2/K_2O$ mole ratio typically in the range 8-20:1 and can be concentrated if desired to increase the solids. The binder is a clear, stable solution and is stable in the presence of zinc, but coatings based on these ion exchanged binders have relatively poor film strength compared to coatings based on alkali silicate binders.

Preferably, a binder having a pH in the range 9 to 11.5 is used, more preferably in the range 9.5 to 11. While we do not wish to be bound by any theory explaining the pH effect on the film properties, it appears that an increased pH results in an increased amount of soluble silica in solution. This seems to have the potential for effecting insitu gel reinforcement after the application of the coating composition. Additionally, pH adjustment can have a minor pot life-extending effect. When a commercially obtainable silica sol is used, a sol with a high pH can be selected and/or the pH of the sol can be adjusted. The pH can be adjusted, for example, by adding pH-influencing pot life extenders such as dimethyl amino ethanol (DMAE), or by adding dilute sulphuric acid, or by adding sodium hydroxide.

The primer coating preferably contains zinc powder and/or a zinc alloy. Such zinc powder preferably has a volume averaged mean particle size of 2 to 12 microns and most preferably such zinc powder is the product sold commercially as zinc dust having a mean particle size of 2 to 8 microns. The zinc powder protects the steel by a galvanic mechanism and may also form a protective layer of zinc corrosion products enhancing the corrosion protection given by the coating. All or part of the zinc powder can be replaced by a zinc alloy. The amount of zinc powder and/or alloy in the coating is generally at least 10% and may be up to 90% by volume of the coating on a dry film basis. The zinc powder and/or alloy can be substantially the whole of the pigmentation of the coating or can for example comprise up to 70%, for example 25 to 55%, by volume of the coating, on a dry film basis, with the coating also containing an auxiliary corrosion inhibitor, which can for example be a molybdate, phosphate, tungstate or vanadate, as described in U.S. Pat. No. 5,246,488, ultrafine titanium dioxide as detailed in KR 8101300, and/or zinc oxide and/or a filler such as silica, calcined clay, alumina silicate, talc, barytes, mica, magnesium silicate, or calcined aluminium silicate.

For compositions comprising a binder having colloidal silica particles with an average particle size equal to or below 10 nm, the amount of zinc powder and/or alloy in the coating is 40 to 60%, preferably between 45 and 55% by volume of the coating on a dry film basis. For compositions comprising a binder having colloidal silica particles with an average particle size above 10 nm, for example between 12 and 22 nm, or between 12 and 16 nm, the amount of zinc powder and/or alloy in the coating preferably is between 35 and 50%.

However, other pigments can be used in conjunction with zinc-based pigments. Examples of these other non-zinc pigments include conductive extenders such as di-iron phosphide (Ferrophos®), micaceous iron oxide, etc. Use of these conductive non-zinc pigments may allow a reduction in the zinc level while maintaining effective corrosion protection. To obtain optimum coating properties, extenders are preferably sufficiently dispersed in the coating composition. The types and sizes of the extenders used can be adjusted to obtain an adequate state of dispersion. For example, when the extender pigment Satintone® (ex Lawrence Industries) is selected, a mean particle size below 3 μm, preferably below 2 μm, should be used.

Preferably, the pigment volume concentration (PVC) of the coating is between 40 and 75%. Above 75% film properties are reduced, and below 40% there is insufficient zinc to provide effective corrosion protection. For compositions comprising a binder having colloidal silica particles with an average particle size below 10 nm, the PVC preferably is between 55 and 75%, more preferably between 65 and 75%. For compositions comprising a binder having colloidal silica particles with an average particle size equal to or above 10 nm, improved early coating properties can be obtained using coatings with a PVC between 40 and 65%, more preferably between 45 and 55%.

The pigment volume concentration (PVC) is the volume percentage of pigment in the dry paint film. The critical pigment volume concentration (CPVC) is normally defined as the pigment volume concentration where there is just sufficient binder to provide a completely adsorbed layer of binder on the pigment surfaces and to fill all the interstices between the particles in a close-packed system. The critical pigment volume concentration can be determined by wetting out dry pigment with just sufficient linseed oil to form a coherent mass. This method yields a value known as the "oil absorption", from which the critical pigment volume concentration can be calculated. The method for determining the oil absorption is described in British Standard 3483 (BS3483).

The solids content of the primer coating generally is at least 15% by volume and preferably in the range of 20 to 35% by volume. The volume solids content is the theoretical value calculated on the basis of all components present in the coating composition. The coating preferably has a viscosity such that it can easily be applied by conventional coating applicators such as spray, particularly airless spray or high volume low pressure (HVLP) spray applicators, to give a coating having a dry film thickness of less than 40 microns, preferably between 12 and 25 to 30 microns.

Optionally, the coating composition may comprise further additives well-known to the skilled person, e.g., thixotropes and/or rheology control agents (organo clays, xanthan gum, cellulose thickeners, polyether urea polyurethanes, acrylics, etc.), defoamers (in particular when latex modifiers are present), and (secondary) pot life extenders, such as chromates (for example sodium dichromate) or tertiary amines (for example triethylamine or dimethylaminoethanol). Preferred thixotropes and/or rheology control agents include Bentone® EW (ex Elementis), which is a sodium magnesium silicate (organo clay), Bentolite® WH (ex Rockwood), which is a hydrous aluminium siliate, Laponite® RD (ex Rockwood), which is a hydrous sodium magnesium lithium silicate, and Rheolate®425 (ex Elementis), which is a proprietary acrylic dispersion In water. Preferred defoamers Include Foamaster® NDW (ex Cognis) and Dapro®1760 (ex Elementis). Preferred secondary pot life extenders are tertiary amines which offer a chromate-free option for pot life extension. If no secondary pot life extenders are present, the coating composition normally has a pot life between <1 and 4 hours. Usually it is sufficient to add only a small quantity (0.0125-0.025 wt% based on liquid paint) of sodium dichromate to obtain a pot life of greater than 24 hours, Higher levels normally lead to poor properties of the coating. Normally the coating system is provided as a two-(or more) component system. A longer pot life is also found for systems comprising silica sols having an alumina-modified surface. The use of alumina-modified silica sols to extend the pot life of these coating compositions is the subject of a separate patent application.

It is possible to prepare the coating composition just prior to application of the coating, for example by feeding and thoroughly mixing all components of the coating composition shortly before application. Such a process can also be referred to as on-line mixing of the components that are present in the coating composition. This process is suited in particular to coating compositions that have a limited pot life.

Before the coated substrate is immersed in water or alternatively kept in an atmosphere with a relative humidity of at least 50%, the primer coating is dried to the extent that it is touch dry. The time to touch dry generally is about 10 to 15 minutes at ambient temperatures of 15 to 20° C. or 3 to 4 minutes at 40° C. for a 15-20 μm dry film thickness (dft) coating. The drying time is also dependent on air flow and film thickness. At 35° C. and 0.5 m/s air flow, the drying time for a 20 μm dry film thickness coating is approximately 2 minutes. This time can be further reduced by increasing the air temperature.

In general, the drying time can be reduced by increasing the substrate temperature, increasing the air temperature, using an air flow, or by any combination thereof.

It is preferred to carry out drying of the primer coating at 10-60° C., preferably 25-50° C. in a forced air flow, preferably in an air flow of at least 0.1 m/s. Achieving fast drying is very important for on-line application in shipyards or steel mills.

In a preferred process, the coated substrate is immersed in water. It is not necessary to immerse the coated substrate once the primer coating has dried to the extent that it is touch dry. It is also possible to dry the coating for a (much) longer time. However, when the coated substrate is immersed in water before the primer coating is touch dry, in general a decrease in coating properties is observed.

In another embodiment of the process according to the present invention, the coated substrate is kept in an atmosphere with a relative humidity of at least 50% after the primer coating has dried to the extent that it is touch dry. Even faster development of properties is achieved when the coated substrate is kept in an atmosphere with a relative humidity of at least 80%. It is not necessary to bring the coated substrate into an atmosphere with a relatively high humidity once the primer coating has dried to the extent that it is touch dry. It is also possible to dry the coating for a (much) longer time. Furthermore, it is possible to dry the coated substrate in an atmosphere with a relatively high humidity.

To further accelerate the development of the physical properties of the coated substrate, prior to immersion in water or prior to the alternative, storage for some time in an atmosphere with a relative humidity of at least 80%, the substrate can be treated with a solution which increases the film strength of the primer coating. Before such a solution is applied to the substrate, the primer coating should be dried to the extent that it is touch dry.

This solution can in general be an aqueous solution of an inorganic salt or a solution of material having reactive silicon-containing groups. The increase in film strength can be detected by a significant increase in hardness, abrasion resistance, and usually adhesion. Hardness can be measured with the aid of the pencil hardness test of British Standard 3900, part E19 (1999) (hardness of pencil required to gouge the coating). Abrasion resistance can be measured using a double rub test which automatically rubs the coating and can be carried out dry or wet with water. While a significant increase in either dry or wet abrasion resistance would be regarded as an increase in film strength of the primer coating, we have found that the treatment according to the invention generally increases both dry and wet abrasion resistance. Adhesion can be measured by a cross hatch test as described in British Standard 3900, part E6 (1992).

The amount of film strength-enhancing solution optionally applied to the primer coating is generally in the range 0.005-0.2, preferably 0.01-0.08 liters per square meter of primer coated surface (L/m²) for coatings applied at standard dry film thickness (15-20 μm). Such an amount of solution can conveniently be applied by spraying. Needless to say, the concentration or the volume of the post-treatment solution should be increased if the coating is over-applied, i.e. in a dry film thickness >20 μm.

When the optionally applied film strength-enhancing solution is an aqueous solution of an inorganic salt, it generally has a concentration of at least 0.01M and preferably of at least 0.03M. The concentration of the inorganic salt solution can be up to 0.5M or 1M or even higher. The inorganic salt can be the salt of a monovalent cation such as an alkali metal or ammonium salt, of a divalent cation such as zinc, magnesium, calcium, copper (II) or iron (II), of a trivalent cation such as aluminium or cerium (III), or of a tetravalent cation such as cerium (IV), and of a monovalent anion such as a halide, for example fluoride, chloride or bromide, or nitrate, or a polyvalent anion such as sulphate or phosphate. Mixtures of the above-mentioned salts can also be used. Examples of inorganic salt solutions which have been found effective are magnesium sulphate, zinc sulphate, potassium sulphate, aluminium sulphate, iron sulphate, cerium (IV) sulphate, copper sulphate, sodium chloride and potassium chloride, although chlorides might not be preferred because of their tendency to promote corrosion. The use of zinc sulphate or aluminium sulphate is preferred.

The concentration of the inorganic salt solution in weight terms preferably is in the range of 0.5-20% by weight.

One example of a material having active silicon-containing groups is a silicate. The film strength-enhancing solution can be an alkali metal silicate solution, for example potassium silicate or lithium silicate, or an ammonium silicate solution or it can be an alkali metal siliconate, for example an alkyl siliconate solution. The preferred concentration of such a solution is in the range of 0.5-20% by weight.

When the optionally applied film strength enhancing solution is a solution of an inorganic salt or alkali metal silicate, the added material will increase the salt content of the zinc silicate primer coating. This will tend to increase the osmotic driving force when the coating is overcoated and thus the possibility of osmotic blistering when the coated substrate is immersed. The amount of inorganic salt of alkali metal silicate applied preferably is low enough for the $SiO_2/M_2O$ mole ratio of the primer coating binder to be kept above 6:1, preferably above 8:1 and most preferably above 10:1. To achieve this, the amount of inorganic salt or alkali metal silicate applied in the film strength-enhancing solution preferably is less than 10 g/m² on a dry weight basis, most preferably less than 5 g/m², for a coating with a dry film thickness of 15-20 μm.

An alternative example of a material having reactive silicon-containing groups is an alkoxy silane or an acyloxy silane, for example acetoxy silane. This can for example be a tetraalkoxy silane (alkyl orthosilicate) such as tetraethoxy silane or tetraisopropoxy silane, or a trialkoxy silane such as methyl trimethoxy silane (MTMS, ex Aldrich) or bistrimethoxy silane ethane. The alkoxy silane may contain additional functional groups, for example a trialkoxy silane can have the formula $RSi(OR^1)_3$, wherein each $R^1$ group is 1-3C alkyl and R is an alkyl or aryl group substituted by an amino, alkylamino, dialkylamino, amide, halogen, carbamate, epoxide, isocyanate, aziridine, sulphonate, carboxylate, phosphate or hydroxyl group. Preferred examples are aminosilanes such as triethoxy silyl propyl amine (Aminosilane A1100 ex Witco), trimethoxy silyl propyl amine (Aminosilane A1110 ex Witco), trimethoxy silyl propylethylene diamine (Aminosilane A1120 ex Witco), trimethoxy silyl propyldiethylene triamine (Aminosilane A1130 ex Witco) or bistrimethoxy silyl propylethylene diamine. Further, the alkoxy silane can be a bis(trialkoxy silane), for example an alkylene or polydimethyl silane chain tipped with —SiOR'$_3$ groups. The alkoxy silane can be at least partially hydrolyzed, for example a partially hydrolyzed tetraalkoxy silane, or a hydrolyzed alkyl trialkoxy silane or aminoalkyl trialkoxy silane, can be used. The alkoxy silane is preferably applied from aqueous solution, although the aqueous solution can contain a water-miscible organic solvent, for example an alcohol such as ethanol.

Further, it was found that orthosilicates also are very effective property enhancers in this process. Aqueous solutions of tetramethyl orthosilicate (TMOS) and tetraethyl orthosilicate (TEOS) are effective post-treatment agents. Better results are obtained if TMOS or TEOS is hydrolyzed at pH 1-2. At this pH the pot life of the post treatment solution can even exceed 7 days.

The concentration of alkoxy silane or orthosilicates in the optionally applied treatment solution preferably is in the range 1-25% by weight.

The use of alkoxy silanes and/or orthosilicates in the optionally applied post-treatment solution is preferred, since these compounds add virtually zero level of water-soluble salts to the shop primer.

The amount of optionally applied film strength-enhancing solution used preferably is 0.005-0.2 L/m$^2$ of primer coated surface, most preferably 0.08 L/m$^2$ or less if the coating is treated and dried on-line, for a coating with a dry film thickness of 15-20 µm. The drying time for this coating treated with such an amount of film strength-enhancing solution generally is about 5 to 10 minutes at 15-20° C. or about 1.5 to 2 minutes at 40° C. The drying time can be further reduced by placing the primed substrate in an air flow.

In general, the drying time can be reduced by increasing the substrate temperature, increasing the air temperature, using an air flow, or by any combination thereof.

The optionally applied treatment solution is preferably applied and dried at a temperature in the range 10-60° C., preferably 25-50° C. in a forced air flow, preferably an air flow of at least 0.1 m/s. The treatment solution can be applied by standard spray application equipment, for example airless spray or HVLP spray, or by a simple atomizer spray, simply by mounting a second spray gun further down the shop primer line from the spray gun applying the primer. Alternatively, the solution can be applied by using a mist coating application technique. The treatment solution can be applied to both sides of a substrate, for example to both sides of a steel plate for use in shipbuilding, irrespective of the orientation of the substrate; the volume of solution required to strengthen the film is such that the solution can be applied to the underside of a plate without sagging or dripping. Other methods of application such as application by roller are possible but not preferred. The treated primer coating only needs to be allowed to dry on the substrate and does not require any subsequent washing or heating; once the treated primer is dry, the coated product can be handled normally.

It was found that the additional step of using a film strength-enhancing solution is particularly advantageous when the primer comprises a binder containing silica sol particles with an average diameter above 10 nm, and even more advantageous for silica sol particles with an average diameter above 16 nm. In particular, good results were found when after treatment with the film strength-enhancing solution, the coated substrate was immersed in water or kept in an atmosphere with a relative humidity of at least 80%.

The process according to the invention increases the hardness, cohesion, and abrasion resistance of the shop primer without introducing the disadvantage of blistering when overcoated. Further, the process accelerates the development of these favourable properties. Their development can be accelerated even further by treatment with a film strength-enhancing solution. The accelerated development of these properties improves the resistance to damage during handling and fabrication in a shipyard or steel mill. In addition to these benefits, the primed substrate shows the performance characteristics required in the shop primer market, viz. corrosion resistance of 6 months on outdoor exposure, excellent welding/cutting characteristics, and overcoatability with a wide range of primer coatings without blistering or pinholing.

The primed substrate can be overcoated with an amine-cured epoxy resin coating, or any other heavy-duty coating such as a polyurethane, at a film thickness of 100 µm or 200 µm, and after being allowed to cure for 7 days can be immersed in fresh or sea water for over 6 months (longest test period thus far) at 40° C. without blistering.

The invention will be elucidated with reference to the following examples. These are intended to illustrate the invention but are not to be construed as limiting in any manner the scope thereof.

The determination of the sol size of the silica sols used in the examples has been performed via the titration method described in G. W. Sears, *Anal. Chem.* 12, 1981 (1956). By means of this method, the specific surface area has been determined in square meters per gram. For the spherical sol particles, this surface area was converted to a particle size.

The compounds used as starting material in the examples have the following origin:

Ludox® SM a silica sol of concentration 30% by weight, average particle size 7 nm, SiO$_2$/Na$_2$O mole ratio 50:1, ex DuPont, pH 10.3

Ludox® HS-40 a silica sol of concentration 40% by weight, particle size 12 nm, SiO$_2$/Na$_2$O mole ratio 95:1, ex DuPont, pH 9.8

Bindzi® 40/170 a silica sol of concentration 40% by weight, average particle size 20 nm, SiO$_2$/Na$_2$O mole ratio 160:1, ex Akzo Nobel (Eka Chemicals), pH 9.4

Bindzi® 25AT/360 an alumina-modified silica sol of concentration 25.5% by weight, 0.44 wt.% alumina, average particle size 7 nm, SiO$_2$/Na$_2$O mole ratio 50:1, ex Akzo Nobel (Eka Chemicals), pH 10

NYACOL a silica sol of concentration 40% by weight and average particle size 16 nm, SiO$_2$/Na$_2$O mole ratio 105:1, ex Akzo Nobel (Eka Chemicals), pH 9.8

XZ 94770 a styrene/butadiene organic latex of 50 vol.% solids, ex Dow Chemicals.

HUBER 90C a calcined aluminium silicate extender pigment of 0.7 µm mean particle size, ex JM Huber/Marlow Chemicals Satintone® W a calcined aluminium silicate extender pigment of 1.4 µm mean particle size, ex Lawrence Industries Zinc dust a 7 µm mean particle size metal powder, ex Trident Alloys Molywhite 212 calcium zinc molybdate, an anticorrosive pigment of particle size 4.1 µm, ex Sherwin Williams MINEX 20 a sodium potassium aluminum silicate extender pigment of 2.95 µm mean particle size, ex North Cape Minerals Bentone® EW a sodium magnesium silicate thixotrope, ex Elementis

EXAMPLE 1

To examine the effect of drying conditions on the properties of the cured shop primer coatings, a coating composition having a solids concentration of 28% by volume was prepared from the following ingredients. The primer coating had a pigment volume concentration of 71.0%, which is 1.4 times the critical pigment volume concentration.

| Component | % by weight |
| --- | --- |
| Ludox ® SM silica sol | 30.6 |
| Water | 13.5 |
| Bentonite clay thixotrope | 0.2 |
| Zinc dust | 48.2 |
| HUBER 90C | 7.5 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 μm at 35° C. and 30% relative humidity. As soon as the coatings were touch dry the primed substrates were stored in different relative humidity conditions.

The abrasion resistance of the coated panels was measured (double rub test) 1 day after application of the primer. In the double rub test the treated surface is wetted with a couple of drops of water (in the case of wet double rubs), then rubbed with a cotton wool swab using light pressure. One pass to and fro is a double rub. The results are expressed as the number of double rubs till removal of the coating. If the coating survives 100 double rubs, the final dry film thickness (dft) is compared to the initial value. If the dry film thickness is reduced by more than 25%, the result is expressed as >100. If the dry film thickness is reduced by less than 25%, the result is expressed as >>100. The results are shown in Table 1 below.

TABLE 1

| Example No. | Sol size | Relative Humidity (%) | WDR 24 hours[2] |
| --- | --- | --- | --- |
| 1a[1] | 7 nm | 20 | 18 |
| 1b[1] | 7 nm | 40 | 30 |
| 1c | 7 nm | 60 | 72 |
| 1d | 7 nm | 80 | >>100 |
| 1e | 7 nm | 100 | >>100 |

[1]Comparative example
[2]Wet double rubs measured 24 hours after application

EXAMPLE 2

To examine the effect of drying conditions on the properties of the cured shop primer coatings, a coating composition having a solids concentration of 28% by volume was prepared from the following ingredients. The primer coating had a pigment volume concentration of 70%, which is 1.06 times the critical pigment volume concentration.

| Component | % by weight |
| --- | --- |
| Ludox ® SM silica sol | 27.6 |
| Zinc | 41.6 |
| Minex 20 | 9.1 |
| Molywhite 212 | 2.2 |
| Bentone EW | 0.2 |
| Water | 17.5 |
| XZ94770 | 1.8 |

The primer was applied to 15 cm×10 cm steel panels in a dry film thickness of 15-20 μm. Each panel was allowed to dry in a different relative humidity. One panel was dried to the extent that it was touch dry in 40% relative humidity during 30-60 minutes after the coating application. Then the panel was immersed in water for 30 minutes. The water was removed and the coating was subsequently allowed to dry in 60% relative humidity.

The abrasion resistance of the coated panels was measured (double rub test) 1 hour after application of the primer. For the sample that was immersed in water, the abrasion resistance was measured 1 hour after immersion. The results are shown in Table 2 below.

TABLE 2

| Example No. | Sol size | Relative Humidity (%) | WDR 1 hour[2] | WDR 24 hours[3] |
| --- | --- | --- | --- | --- |
| 2a[1] | 7 nm | 20 | 15 | 24 |
| 2b[1] | 7 nm | 35 | 30 | 54 |
| 2c | 7 nm | 50 | 49 | 85 |
| 2d | 7 nm | 60 | 52 | >>100 |
| 2e | 7 nm | 80 | 64 | >>100 |
| 2f | 7 nm | Immersed in water | >100 | >>100 |

[1]Comparative example
[2]Wet double rubs measured 1 hour after application or after immersion in water
[3]Wet double rubs measured 24 hours after application or after immersion in water

EXAMPLE 3

A coating composition having a solids concentration of 28% by volume was prepared from the following ingredients. The primer coating had a pigment volume concentration of 70%, which is 1.06 times the critical pigment volume concentration.

| Component | % by weight |
| --- | --- |
| Silica sol Bindzil ® 25AT/360 (0.44 wt. % Al) | 32.5 |
| Zinc | 41.6 |
| MINEX 20 | 9.1 |
| Molywhite 212 | 2.2 |
| Bentone ® EW | 0.2 |
| Water | 12.6 |
| XZ94770 | 1.8 |

In the same way as described in Example 2, each panel was allowed to dry in a different relative humidity and one sample was immersed in water and subsequently allowed to dry in 60% relative humidity.

The abrasion resistance of the coated panels was measured (double rub test) 1 hour after application of the primer or after immersion in water. The results are shown in Table 3 below.

TABLE 3

| Example No. | Sol size | wt. % alumina | Relative Humidity (%) | WDR 1 hour[2] | WDR 24 hours[3] |
| --- | --- | --- | --- | --- | --- |
| 3a[1] | 7 nm | 0.44 | 20 | 22 | 31 |
| 3b[1] | 7 nm | 0.44 | 35 | 26 | 54 |
| 3c | 7 nm | 0.44 | 50 | 63 | >>100 |
| 3d | 7 nm | 0.44 | 60 | 65 | >>100 |
| 3e | 7 nm | 0.44 | 80 | 78 | >>100 |
| 3f | 7 nm | 0.44 | Immersed in water | >100 | >>100 |

[1]Comparative example
[2]Wet double rubs measured 1 hour after application or after immersion in water
[3]Wet double rubs measured 24 hours after application or after immersion in water

EXAMPLE 4

A coating composition having a solids concentration of 28% by volume was prepared from the following ingredients. The primer coating had a pigment volume concentration of 50%, which is 0.72 times the critical pigment volume concentration.

| Component | % by weight |
|---|---|
| Ludox ® HS-40 silica sol | 35.0 |
| Zinc | 42.2 |
| MINEX 20 | 1.7 |
| Molywhite 212 | 2.2 |
| Bentone ® EW | 0.2 |
| Water | 15.6 |
| XZ94770 | 3.1 |

The primer was applied to 15 cm×10 cm steel panels in a dry film thickness of 15-20 μm. Each panel was allowed to dry in a different relative humidity. One panel was dried to the extent that it was-touch dry in 40% relative humidity during 30-60 minutes after coating application. Then the panel was immersed in water for 30 minutes. The water was removed and the coating was subsequently allowed to dry in 60% relative humidity.

The abrasion resistance of the coated panels was measured (double rub test) 1 day after application of the primer or after immersion in water. The results are shown in Table 4 below.

TABLE 4

| Example No. | Sol size | Relative Humidity (%) | WDR 24 hours[2] |
|---|---|---|---|
| 4a[1] | 12 nm | 20 | 24 |
| 4b[1] | 12 nm | 35 | 58 |
| 4c | 12 nm | 50 | >>100 |
| 4d | 12 nm | 60 | >>100 |
| 4e | 12 nm | 80 | >>100 |
| 4f | 12 nm | Immersed in water | >>100 |

[1]Comparative example
[2]Wet double rubs measured 24 hours after application or after immersion in water

EXAMPLE 5

In the same way as described in Example 4, several coated panels were prepared using a binder NYACOL silica sol (average particle size 16 nm). In the same way as described in Example 4, each panel was allowed to dry in a different relative humidity and one sample was immersed in water and subsequently allowed to dry in 60% relative humidity.

The abrasion resistance of the coated panels was measured (double rub test) 1 day after application of the primer or after immersion in water. The results are shown in Table 5 below.

TABLE 5

| Example No. | Sol size | Relative Humidity (%) | WDR 24 hours[2] |
|---|---|---|---|
| 5a[1] | 16 nm | 20 | 31 |
| 5b[1] | 16 nm | 35 | 87 |
| 5c | 16 nm | 50 | >>100 |
| 5d | 16 nm | 60 | >>100 |
| 5e | 16 nm | 80 | >>100 |
| 5f | 16 nm | Immersed in water | >>100 |

[1]Comparative example
[2]Wet double rubs measured 24 hours after application or after immersion in water

EXAMPLE 6

In the same way as described in Example 1, several coated panels were prepared. After application of the coating the panels were treated as follows:
- one panel was stored for 1 hour at a relative humidity of 35%;
- one panel was stored for 1 hour at a relative humidity of 60% and then immersed in water;
- one panel was treated with a film strength-enhancing solution containing TEOS prior to the immersion in water.

The results are shown in Table 6 below.

EXAMPLE 7

In the same way as in Example 6, several coated panels were prepared using a binder Ludox® HS-40 silica sol (average particle size 12 nm). After application of the coating the panels were treated as follows:
- one panel was stored for 1 hour at a relative humidity of 35%;
- one panel was stored for 1 hour at a relative humidity of 60% and then immersed in water;
- one panel was treated with a film strength-enhancing solution containing TEOS prior to the immersion in water.

The results are shown in Table 6 below.

EXAMPLE 8

In the same way as in Example 6, several coated panels were prepared using a binder comprising Bindzi® 40/170 silica sol (average particle size 20 nm). After application of the coating the panels were treated as follows:
- one panel was stored for 1 hour at a relative humidity of 35%;
- one panel was stored for 1 hour at a relative humidity of 60% and then immersed in water;
- one panel was treated with a film strength-enhancing solution containing TEOS prior to the immersion in water.

The results are shown in Table 6 below.

TABLE 6

| Example No. | silica sol particle size (nm) | Treatment | Wet double rubs (dry) |
|---|---|---|---|
| 6a* | 7 | 60 minutes storage at 35% RH | 29 |
| 6b | 7 | 30 minutes immersion in water | >>100 |
| 6c | 7 | Treatment with 5% TEOS solution, 30 minutes immersion in water | >>100 |
| 7a* | 12 | 60 minutes storage at 35% RH | 35 |
| 7b | 12 | 60 minutes immersion in water | 80-100 |
| 7c | 12 | Treatment with 5% TEOS solution, 60 minutes immersion in water | >>100 |
| 8a* | 20 | 60 minutes storage at 35% RH | 6 |
| 8b | 20 | 60 minutes immersion in water | 10 |
| 8c | 20 | Treatment with 5% TEOS solution, 60 minutes immersion in water | >>100 |

*Comparative example

EXAMPLE 9

A primer coating having a solids concentration of 28% by volume was prepared from the following ingredients. The primer coating had a pigment volume concentration of 74.6% which is 1.3 times the critical pigment volume concentration ($\lambda=1.3$).

| Component | % by weight |
| --- | --- |
| Ludox ® SM | 27.3 |
| Water | 15.7 |
| Bentonite clay thixotrope | 0.2 |
| Zinc dust | 48.2 |
| Satintone ® | 8.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 µm. The primer was allowed to dry at 25° C., 75% RH and was tested for its physical properties 10 minutes and 1 day after application. The results of the tests are shown in Table 7.

EXAMPLE 10

A primer coating having a solids concentration of 28% by volume was prepared from the following ingredients. The primer coating had a pigment volume concentration of 74.6%, which is 1.3 times the critical pigment volume concentration ($\lambda=1.3$).

| Component | % by weight |
| --- | --- |
| Ludox ® SM | 22.0 |
| XZ 94770 | 1.5 |
| Water | 19.1 |
| Bentonite clay thixotrope | 0.2 |
| Zinc dust | 48.6 |
| Satintone ® | 8.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 µm. The primer was allowed to dry at 25° C., 75% RH and was tested for its physical properties 10 minutes and 1 day after application. The results of the tests are shown in Table 7.

EXAMPLE 11

A primer coating having a solids concentration of 28% by volume was prepared from the following ingredients. The primer coating had a pigment volume concentration of 68.4%, which is 1.15 times the critical pigment volume concentration ($\lambda=1.15$).

| Component | % by weight |
| --- | --- |
| Ludox ® SM | 27.6 |
| XZ 94770 | 1.8 |
| Water | 15.1 |
| Bentonite clay thixotrope | 0.2 |
| Zinc dust | 48.9 |
| Satintone ® | 6.4 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 µm. The primer was allowed to dry at 25° C., 75% RH and was tested for its physical properties 10 minutes and 1 day after application. The results of the tests are shown in Table 7.

EXAMPLE 12

A primer coating having a solids concentration of 28% by volume was prepared from the following ingredients. The primer coating had a pigment volume concentration of 71.5%, which is 1.4 times the critical pigment volume concentration ($\lambda=1.4$).

| Component | % by weight |
| --- | --- |
| Ludox ® SM | 24.7 |
| XZ 94770 | 1.6 |
| Water | 17.2 |
| Bentonite clay thixotrope | 0.2 |
| Zinc dust | 48.7 |
| HUBER 90C | 7.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 µm. The primer was allowed to dry at 25° C., 75% RH and was tested for its physical properties 10 minutes and 1 day after application. The results of the tests are shown in Table 7.

EXAMPLE 13

A primer coating having a solids concentration of 28% by volume was prepared from the following ingredients. The primer coating had a pigment volume concentration of 71.5%, which is 1.4 times the critical pigment volume concentration ($\lambda=1.4$).

| Component | % by weight |
| --- | --- |
| Ludox ® SM | 20.7 |
| XZ 94770 | 1.3 |
| Water | 19.9 |
| Bentonite clay thixotrope | 0.2 |
| Zinc dust | 48.3 |
| HUBER 90C | 6.1 |
| 'Molywhite' molybdate pigment | 3.5 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 µm. The primer was allowed to dry at 25° C., 75% RH and was tested for its physical properties 10 minutes and 1 day after application. The results of the tests are shown in Table 7.

TABLE 7

| Example No. | Mechanical properties 10 minutes after application | | | Mechanical properties 1 day after application | | |
|---|---|---|---|---|---|---|
| | Double rubs Dry/Wet | Pencil Hardness | Cross hatch Adhesion | Double rubs Dry/Wet | Pencil Hardness | Cross-hatch Adhesion |
| 9 | >100/12 | HB | — | >>100/>>100 | 3H | 1 |
| 10 | >>100/12 | 2H | 3 | >>100/>>100 | 6H | 4-5 |
| 11 | >>100/17 | 2H | 1-2 | >>100/>>100 | 4-6H | 3-4 |
| 12 | >>100/21 | 2H | 3 | >>100/>>100 | 6H | 2-4 |
| 13 | >100/6 | 2-3H | 3 | >>100/>>100 | 2-3H | 3 |

The results in Table 7 show that good coating properties can be obtained using a wide range of coating formulations.

EXAMPLES 14 AND 15

Two primer coatings having a solids concentration of 28% by volume were prepared using blends of sols. Both primer coatings had a pigment volume concentration of 50%, which is 0.72 times the critical pigment volume concentration.

The primer coating used in Example 14 was prepared from the following ingredients, resulting in a coating with an average sol size of 10 nm.

| Component | % by weight |
|---|---|
| Ludox ® SM (7 nm) | 5.5 |
| Ludox ® HS-40 (12 nm) | 29.6 |
| XZ 94770 | 3.1 |
| Water | 15.5 |
| Bentone EW | 0.2 |
| Zinc | 42.2 |
| Molywhite 212 | 2.2 |
| MINEX 20 | 1.7 |

The primer coating used in Example 15 was prepared from the following ingredients, resulting in a coating with an average sol size of 10 nm.

| Component | % by weight |
|---|---|
| Ludox ® SM (7 nm) | 6.8 |
| NYACOL (16 nm) | 30.0 |
| XZ 94770 | 3.1 |
| Water | 13.9 |
| Bentone EW | 0.2 |
| Zinc | 42.1 |
| Molywhite 212 | 2.2 |
| MINEX 20 | 1.7 |

The obtained primer coatings were applied to 15 cm×10 cm steel panels in a dry film thickness of 15-20 µm and allowed to dry at 35° C., 30% RH. Within 1 hour the primed substrates were stored at 60% RH. Subsequently, the coatings were tested for their physical properties 1 hour and 1 day after application. The results of the tests are shown in Table 8.

TABLE 8

| Example No. | Sol sizes in the blend | Mechanical properties 1 hour after application | | Mechanical properties 24 hours after application | |
|---|---|---|---|---|---|
| | | Wet double rubs | Pencil Hardness | Wet double rubs | Pencil Hardness |
| 14 | 7 nm/12 nm | 42 | HB | >>100 | H |
| 15 | 7 nm/16 nm | 28 | HB | >>100 | H |

The results in table 8 show that good film properties can be obtained using a blend of sols.

The invention claimed is:

1. A process for primer coating a steel substrate comprising coating a steel substrate with a shop primer coating comprising a silica binder, the binder comprising an aqueous silica sol having a $SiO_2/M_2O$ mole ratio, wherein M represents the total of alkali metal and ammonium ions, of at least 25:1, drying the primer coating at a temperature of from 10° C. to 60° C. and, after the primer coating has dried to the extent that it is touch dry, immersing the coated substrate in water and/or storing it in an atmosphere with a relative humidity of at least 50%, wherein the coating has a dry film thickness of less than 40 microns, and wherein the primer coating optionally comprises alkali metal silicate at a weight ratio of alkali metal silicate to silica sol of less than 0.1; and, wherein said silica sol further contains an organic resin, in an amount of from 1 to 35% by weight, based on solid binder, wherein the organic resin is a latex.

2. A process according to claim 1, wherein the coated substrate is stored in an atmosphere with a relative humidity of at least 60%.

3. A process according to claim 1, wherein the coated substrate is stored in an atmosphere with a relative humidity of at least 80%.

4. A process according to claim 3, further comprising treating the coated substrate with a film strength-enhancing solution prior to immersing it in water or keeping it in an atmosphere with a relative humidity of at least 80%.

5. A process according to claim 4, wherein the film strength-enhancing solution comprises zinc sulphate or aluminium sulphate.

6. A process according to claim 1, further comprising treating the coated substrate with a film strength-enhancing solution prior to immersing it in water and/or storing it in an atmosphere with a relative humidity of at least 50%.

7. A process according to claim 6, wherein the film strength-enhancing solution comprises zinc sulphate or aluminium sulphate.

8. A process according to claim 6, wherein the film strength-enhancing solution is applied at 0.005-0.2 liter per square meter of primer coated surface.

9. A process according to claim 1, wherein the binder comprises colloidal silica particles with an average particle size of less than or equal to 22 nm.

10. A process according to claim 9, wherein the binder comprises colloidal silica particles with an average particle size of less than or equal to 16 nm.

11. A process according to claim 10, wherein the binder comprises colloidal silica particles with an average particle size of less than or equal to 10 nm.

12. A process according to claim 1, wherein the primer coating further comprises zinc powder and/or a zinc alloy.

13. A process according to claim 1, wherein all components of the coating composition are combined and thoroughly mixed shortly before application, and the shop primer coating is applied at a dry film thickness of 12-20 microns.

14. A process according to claim 1, wherein the binder comprises an alumina surface-modified aqueous silica sol.

15. A process according to claim 1, further comprises fabricating the coated substrate and, thereafter, overcoating the coated substrate.

16. A process according to claim 1, wherein the alkali metal is sodium or potassium.

17. A process according to claim 1, wherein the coating has a dry film thickness of 12-20 microns.

18. A process according to claim 1, wherein after the primer coating has dried to the extent that it is touch dry, the coated substrate is immersed in water.

19. A process according to claim 1, wherein the primer coating is free of alkali metal silicate.

20. A process for primer coating a steel substrate comprising
coating a steel substrate with a shop primer coating comprising a silica binder and zinc powder and/or zinc alloy, the silica binder comprising an aqueous silica sol having a $SiO_2/M_2O$ mole ratio, wherein M represents the total of alkali metal and ammonium ions of at least 25:1,
drying the primer coating at a temperature of from 10° C. to 60° C. and, after the primer coating has dried to the extent that it is touch dry,
immersing the coated substrate in water and storing it in an atmosphere with a relative humidity of at least 50%, and
wherein the coating has a dry film thickness of 12-20 microns,
wherein the primer coating optionally comprises alkali metal silicate at a weight ratio of alkali metal silicate to silica sol of less than 0.1; and,
wherein said silica sol further contains an organic resin, in an amount of from 1 to 35% by weight, based on solid binder, wherein the organic resin is a latex.

21. A process according to claim 20, wherein the coated substrate is stored in an atmosphere with a relative humidity of at least 80%, and wherein the process further comprises treating the coated substrate with a film strength-enhancing solution prior to storing it in an atmosphere with a relative humidity of at least 80%.

22. A process according to claim 20, wherein the primer coating is free of alkali meta silicate.

23. A process for primer coating a steel substrate comprising
coating a steel substrate with a shop primer coating comprising a silica binder, the binder comprising an aqueous silica sol having a $SiO_2/M_2O$ mole ratio, wherein M represents the total of alkali metal and ammonium ions, of at least 25:1,
drying the primer coating at a temperature of from 10° C. to 60° C. to the extent that it is touch dry, and, after the primer coating has dried to the extent that it is touch dry,
immersing the coated substrate in water and/or storing it in an atmosphere with a relative humidity of at least 50%, in order to improve abrasion resistance of the coating,
and wherein the coating has a dry film thickness of 12-20 microns,
wherein the primer coating optionally comprises alkali metal silicate at a weight ratio of alkali metal silicate to silica sol of less than 0.1; and,
wherein said silica sol further contains an organic resin, in an amount of from 1 to 35% by weight, based on solid binder, wherein the organic resin is a latex.

24. A process according to claim 23, wherein the primer coating is free of alkali metal silicate.

* * * * *